(12) United States Patent
Lund et al.

(10) Patent No.: US 8,171,949 B1
(45) Date of Patent: May 8, 2012

(54) FLUID FLOW MANAGEMENT

(75) Inventors: Rhownica Lund, Fremont, CA (US);
Andreas Parks, San Jose, CA (US);
Matthew Hendrickson, Saratoga, CA (US)

(73) Assignee: WD Media, Inc., San Jose, CA (US)

( * ) Notice: Subject to any disclaimer, the term of this patent is extended or adjusted under 35 U.S.C. 154(b) by 450 days.

(21) Appl. No.: 12/399,868

(22) Filed: Mar. 6, 2009

(51) Int. Cl.
*F15C 4/00* (2006.01)
*F15C 1/00* (2006.01)

(52) U.S. Cl. .. 137/13; 137/312; 137/561 R; 220/560.03; 220/571

(58) Field of Classification Search .............. 137/13, 137/312, 561 R, 833, 834; 220/571, 571.1, 220/4.12, 4.21, 4.23, 4.24, 23.83, 23.86, 220/23.87, 23.89, 560.03
See application file for complete search history.

(56) References Cited

U.S. PATENT DOCUMENTS

| | | | |
|---|---|---|---|
| 2,626,724 A * | 1/1953 | Smallegan | 220/4.12 |
| 3,857,261 A * | 12/1974 | Wilcox | 68/22 R |
| 4,736,760 A | 4/1988 | Coberly et al. | |
| 5,671,544 A | 9/1997 | Yokomizo et al. | |
| 5,849,104 A | 12/1998 | Mohindra et al. | |
| 6,575,177 B1 | 6/2003 | Brown et al. | |
| 6,666,342 B1 * | 12/2003 | House | 248/214 |

FOREIGN PATENT DOCUMENTS

WO 2008056969 A1 5/2008
* cited by examiner

*Primary Examiner* — Kevin Lee

(57) ABSTRACT

A fluid flow method and apparatus are described. The apparatus includes a trough coupled between tanks to provide an air flow down between the tanks.

23 Claims, 8 Drawing Sheets

FLUID FLOW MANAGEMENT

TECHNICAL FIELD

Embodiments described herein relate to the field of manufacturing, equipment more particularly, to fluid flow management within manufacturing systems.

BACKGROUND

During a series of magnetic recording disk manufacturing operations, a disk's surface is exposed to various types of contaminants. Any material present in a manufacturing operation is a potential source of contamination. For example, sources of contamination may include process gases, chemicals, deposition materials, and liquids. The various contaminants may be deposited on the disk's surface in particulate form. If the particulate contamination is not removed, it may interfere with the proper fabrication of a magnetic recording disk. Therefore, it is necessary to clean contamination from the surface of the disk at one or more stages in the manufacturing process.

Cleaning process typically utilize multiple cleaning tanks between which the disks are moved. Such cleaning tanks contain liquids that are utilized to clean the disks. As the disks are moved between tanks, some of the liquid that is accumulated onto the disks and their handlers may drip therefrom. Conventional multiple tank process lines typical use an airflow restricting cover between tanks to manage liquid drippings. Conventional equipment for managing liquid drippings between tanks include: a flat cover plate as illustrated in FIG. 1A; a flat cover plate and tank weirs as illustrated in FIG. 1B; protruding cover plate and tank weirs as illustrated in FIG. 1C, and; a cover plate with a lip exhaust as illustrated in FIG. 1D. The tank weirs in such conventional systems have a width of 1 to 2 inches and a depth of 1 to 2 inches. A problem with all such conventional mechanisms is that the covers restrict and impede laminar airflow between the tanks. Such conventional covers also create turbulent and unmanageable airflow which could result in additional contamination particles being introduced into the tanks or on the disks as they are transported between tanks.

BRIEF DESCRIPTION OF THE DRAWINGS

Embodiments are illustrated by way of example, and not limitation, in the figures of the accompanying drawings in which.

DETAILED DESCRIPTION

Embodiments of the apparatus and methods are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

A fluid flow apparatus and method to manage air flow and process liquid drippings between process tanks is described. The fluid flow apparatus includes a trough between process tanks that is configured to minimize airflow turbulence above the tanks. The base of the trough may be configured to contain, guide and drain process liquid drippings from workpiece transfer operations between the tanks. In one embodiment, the trough may include either a fixed or removable air guide disposed between side panels of the trough. Further details of embodiments of the present invention are described below.

Figure 1A:
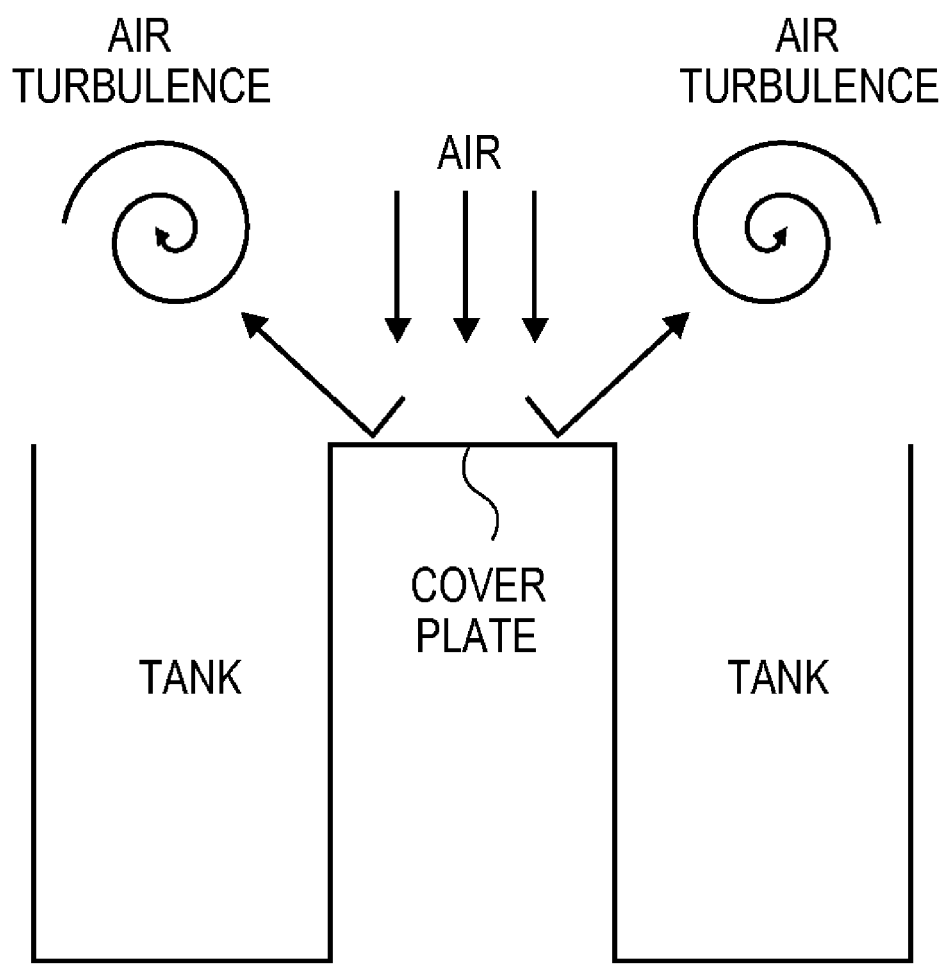
FIG. 1A illustrates a conventional process liquid drippings management system have a flat cover plate between process tanks.
Figure 1B:
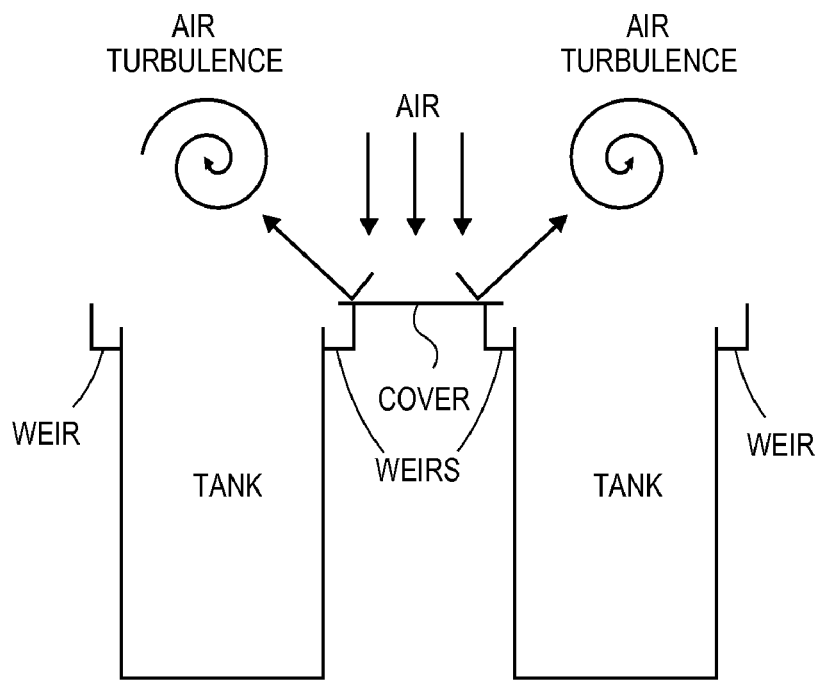
FIG. 1B illustrates a conventional process liquid drippings management system having a flat cover plate and weirs between process tanks.
Figure 1C:
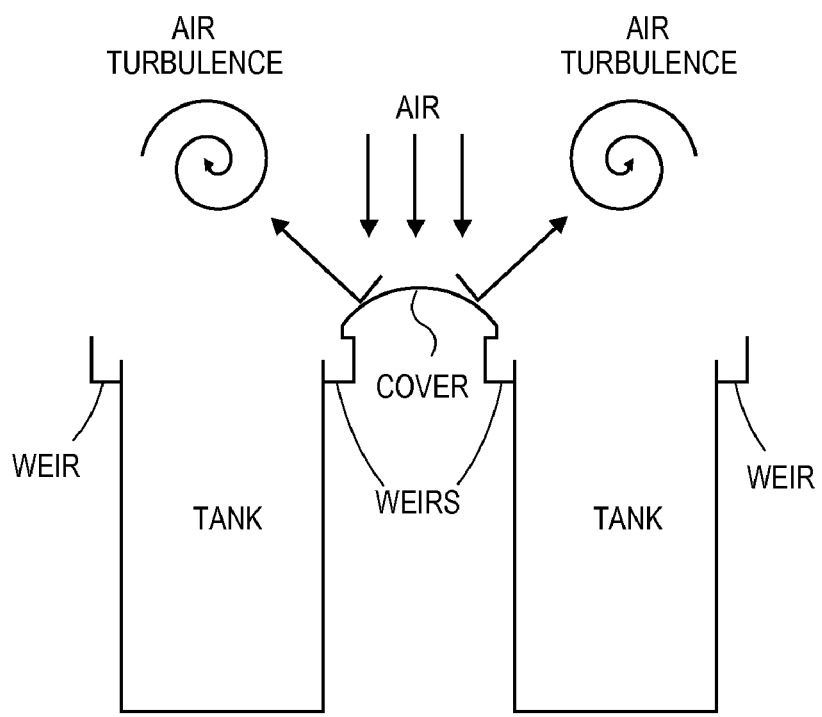
FIG. 1C illustrates a conventional process liquid drippings management system having a protruding cover plate and weirs between process tanks.
Figure 1D:
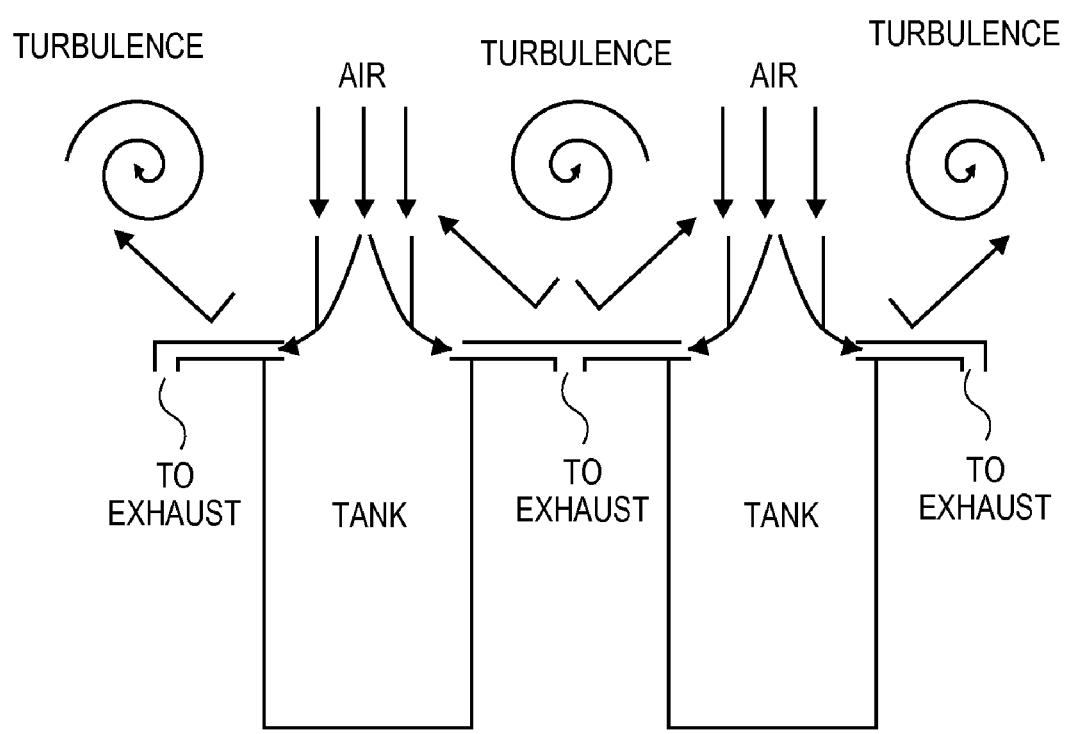
FIG. 1D illustrates a conventional process liquid drippings management system with a flat cover plate having a lip exhaust between process tanks.
Figure 2A:
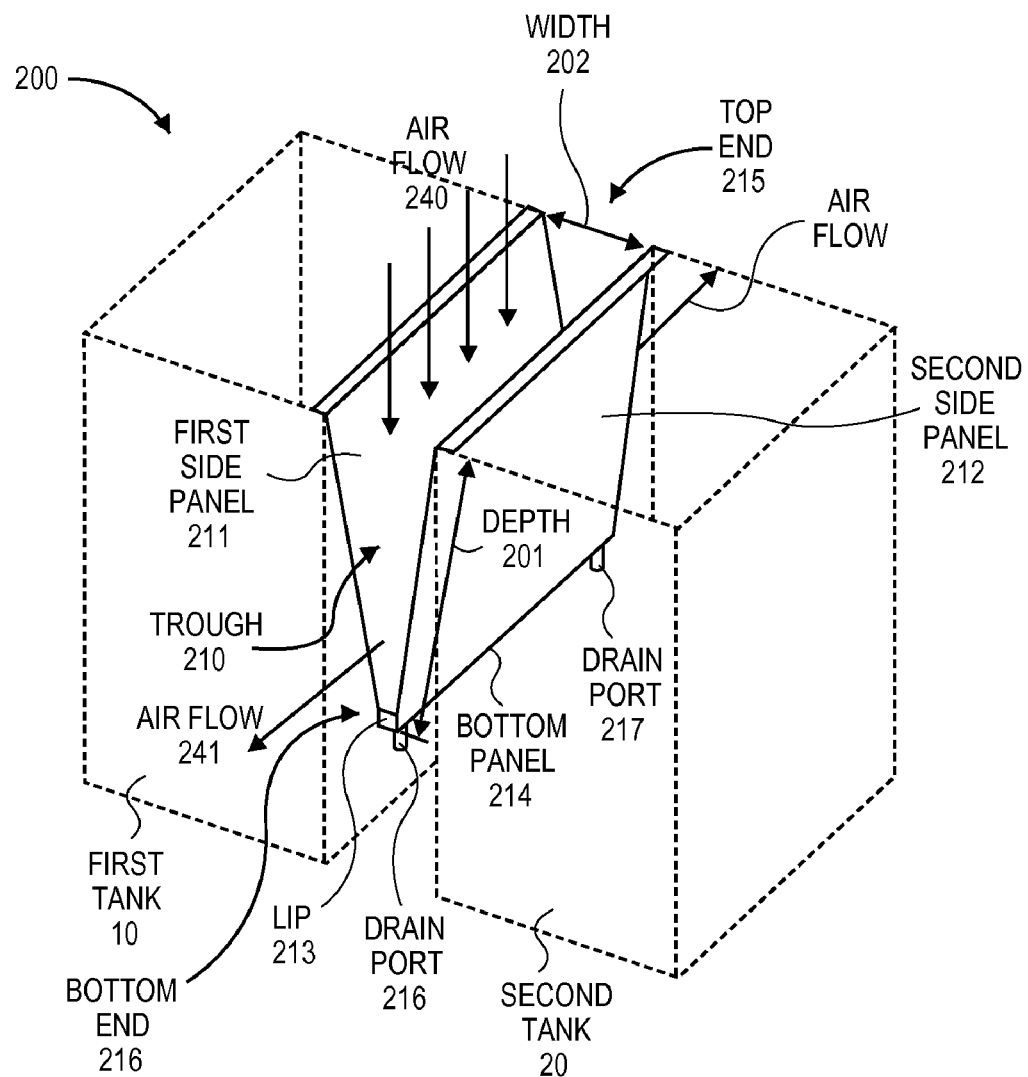
FIG. 2A is a perspective view illustrating a fluid flow apparatus having a trough according to one embodiment of the present invention.

FIG. 2A is a perspective view illustrating a fluid flow apparatus having a trough according to one embodiment of the present invention. Fluid flow management apparatus 200 includes a trough 210 coupled between tanks 10 and 20. In this embodiment, trough 210 has a first side panel 211 coupled to the tank 10 at its top end 215 and a second side panel 212 coupled to the tank 20 at top end 215. In one embodiment, the trough 210 has a depth 201 extending down from top end 215 of the tanks in a range of 3 inches to greater than 2 feet. In one particular embodiment, depth 201 is approximately 18 inches. In one embodiment, the spacing between the side panels of the trough at top end 215 may have a width 202 in a range of 3 inches to greater than approximately 2 feet. In one particular embodiment, width 202 is a range of 14 to 18 inches. Alternatively, trough 210 may have other depths and widths. The second panel 212 is coupled to the first panel 211 at a bottom end 216 of the first and second side panels. In one embodiment, first and second side panels 211 and 212 of trough 210 are closer to each other at the bottom end 216 than at the top end 215. The side panels 211 and 212 of trough 210 may either be perforated or unperforated.

The cavity between the side panels 211 and 212 provides an air path that generates laminar air flow 240 down between the tanks 10 and 20 with air 241 exiting from the side ends of trough 210. By allowing such down flow of air between the tanks, the turbulence, low airflow and air "bounce back" that may otherwise occur with a cover residing between the tanks is minimized.

The trough 210 may also include first and second lips (e.g., lip 213), coupled to the first and second panels 211 and 212 at the bottom end 216 on opposing side ends, to contain process liquid drippings from workpiece transfer operations between tanks 10 and 20. The trough 210 may also include one or more drain ports 216 and 217 coupled to one or more respective holes formed at the bottom end 216 of the first and second side panels to drain process liquid drippings.

In one embodiment, the trough includes a bottom panel 214 that couples together the first and second side panels 211 and 212. Alternatively, the side panels 211 and 212 of trough 210 may be coupled together without the use of a bottom panel as illustrated in FIG. 2B.

Figure 2B:
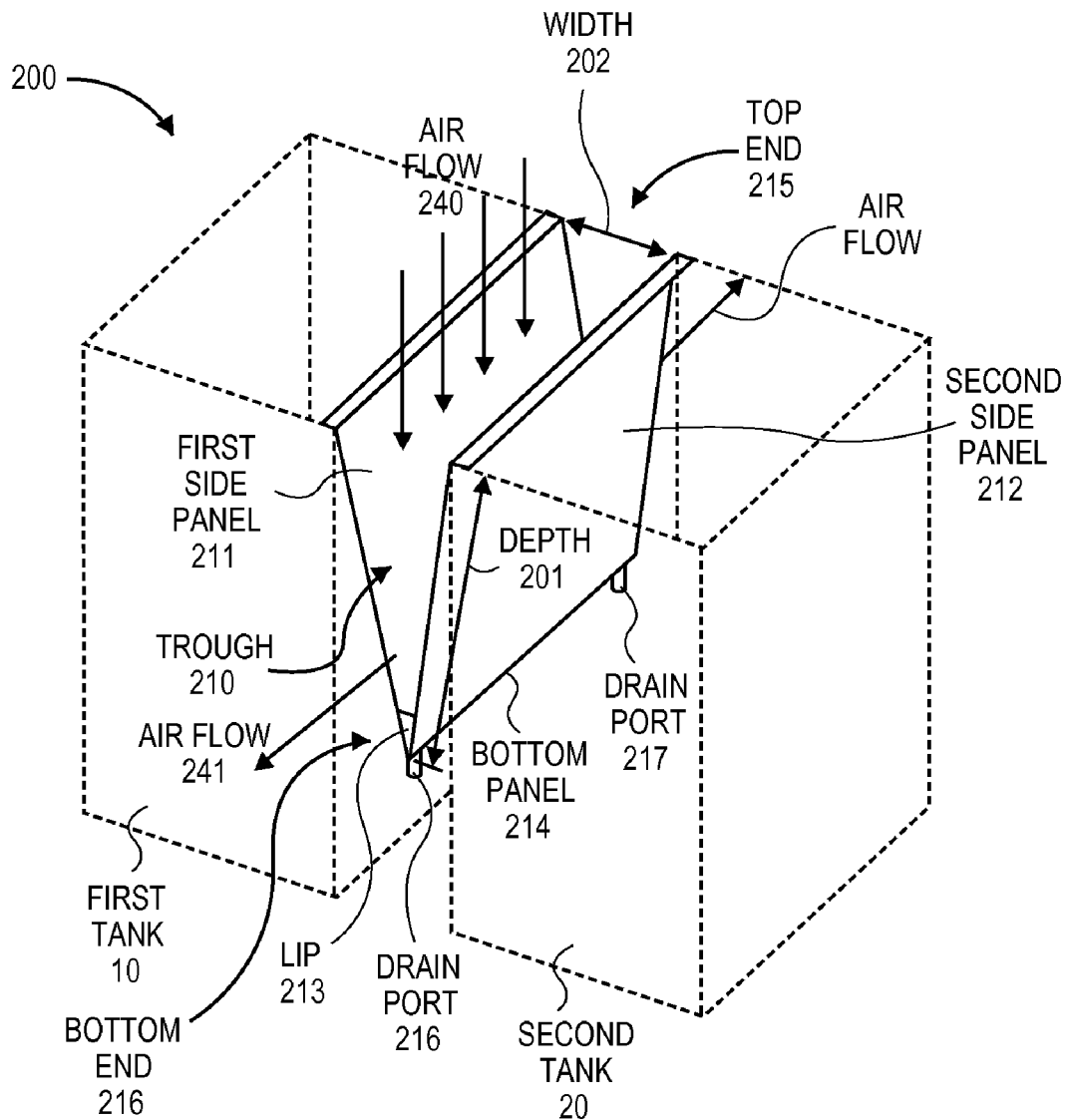
FIG. 2B is a perspective view illustrating a fluid flow apparatus having a trough according another embodiment of the present invention.

In the embodiments shown in FIGS. 2A and 2B, the side panels of trough 210 form substantially a V shape. The side panels 211 and 212 of such a substantially V shaped trough may form an angle in a range of 20 to 60 degrees. In other embodiments, the side panels of the trough (either with or without a bottom panel) may form other shapes, for example, substantially a U shape or square shape (i.e., side panels at approximately 90 degrees with respect to a bottom panel).

Figure 3:
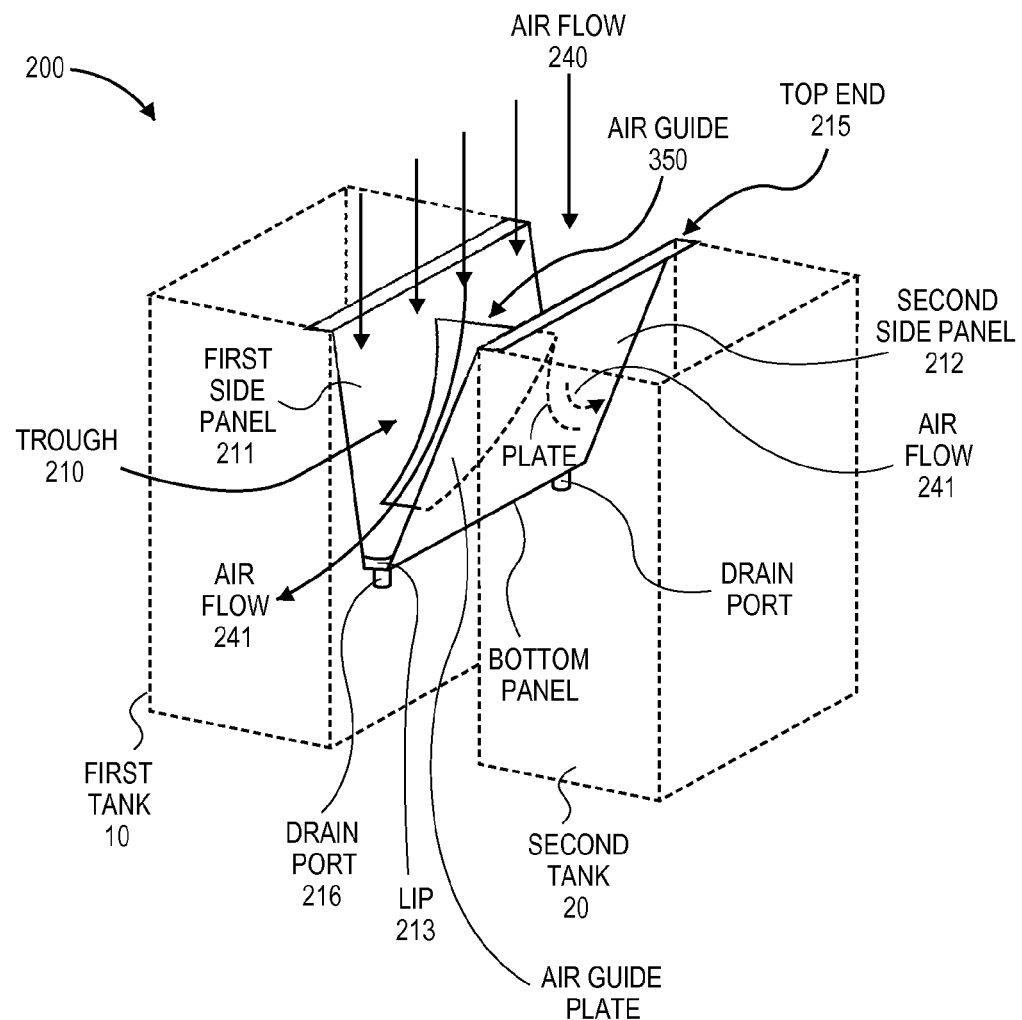
FIG. 3 is a perspective view illustrating a fluid flow apparatus having a trough with an air guide according to one embodiment of the present invention.
Figure 5:
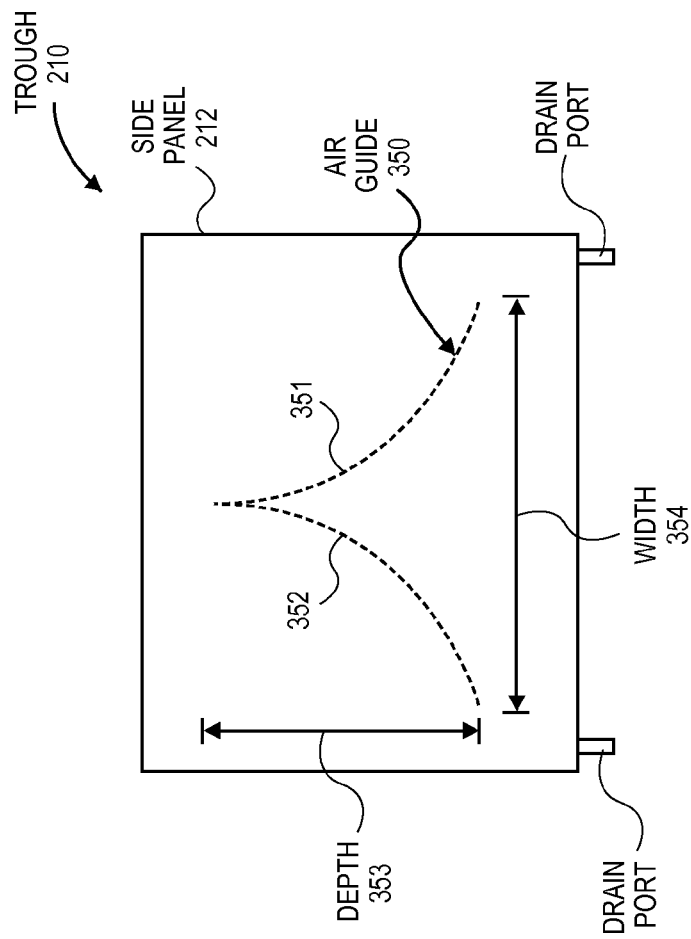
FIG. 5 is a side view illustrating the embodiment of the trough of FIG. 3.
Figure 4:
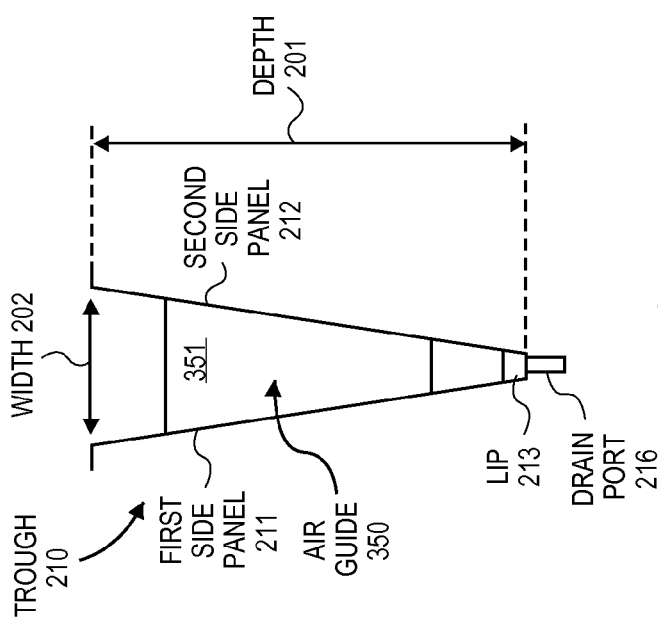
FIG. 4 is a cross section view illustrating the embodiment of the trough of FIG. 3.

FIG. 3 is a perspective view illustrating a fluid flow apparatus having a trough with an air guide according to one embodiment of the present invention. FIGS. 4 and 5 are cross-sectional and side views, respectively, of the fluid flow apparatus of FIG. 3. In this embodiment, trough 210 includes an air guide 350, disposed between the first side panel 211 and second side panel 212, having plates 351 and 352 that are disposed perpendicular to the side panels of the trough. Air guide 350 further facilitates the down flow of air 241 exiting from the side ends of trough 210.

In one embodiment, the air guide 350 plates 351 and 352 split the vertical air down flow 240 above the trough 210 at approximately mid depth 201 of trough. The plates 351 and 352 transition within the confines of the trough 210 to outwardly direct horizontal air flow 241. In one embodiment, the depth 353 of the plates is not greater three quarters of the depth of tanks 10 and 20. Alternatively, the plates 351 ad 352 may have other depths, for example, depth 353 may be the same as depth 201 of the side panels 211, 212 or shallower.

Figure 6:
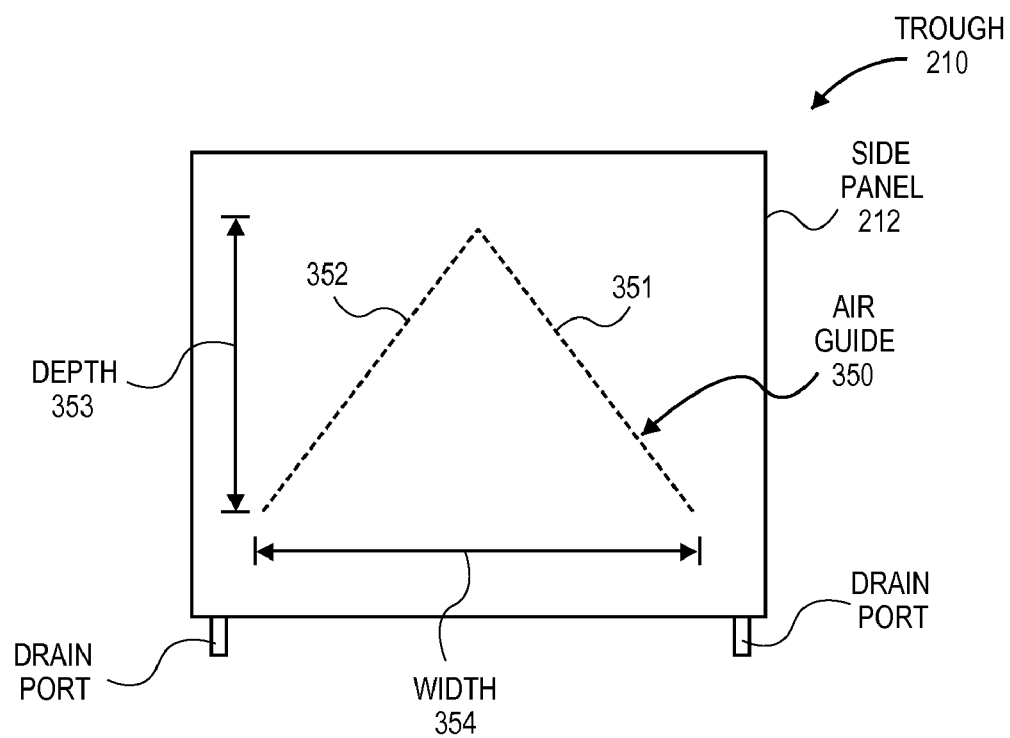
FIG. 6 is a side view illustrating an alternative embodiment of an air guide.

The plates 351 and 352 of air guide 350 can have various shapes and configurations. In the embodiments illustrated in FIGS. 3 and 5, the plates 351, 352 of the air guide 350 are curved. Plates 351 ad 352 may have either a fixed radius or a variable radius (increasing or decreasing radius) from center to ends. In one embodiment, the depth 353, or vertical height, of air guide 350 is less than depth 201 of trough and the width 354 of the air guide 350 is equal to or less than the width 202 of the space between the top end of the side panels of the trough 210. In an alternative embodiment, the plates 351 and 352 of the air guide may not be curved but, rather, flat and angled with respect to the top and bottom ends of the side panels (e.g., an inverted V configuration) as illustrated by air guide 650 in FIG. 6.

In one embodiment, the air guides discussed herein may be removably situated between the side panels of trough 210. In another embodiment, the air guides discussed herein may be permanently affixed to side panels 211 and 212, either by integrally forming the air guide with the first and second side panels of the trough or attaching the air guide using one or more attachment members (e.g., bolts).

In one embodiment, the apparatus and methods described herein may be utilized with cleaning tanks during manufacturing of magnetic recording disks.

Embodiments of cleaning systems have been described with respect to cleaning of magnetic recording disks. It should be appreciated that the embodiments of systems and methods described herein may be applied other types of systems. For example, the tanks described herein may be etching tanks, plating tanks, dry process tanks, etc.

Embodiments of apparatus and methods described herein may also be used for operating on other types of workpieces. The term "workpiece" as used herein may include, substrates, semiconductor wafers, photomasks, magnetic recording disks, optical discs, glass substrates, flat panel display surfaces, liquid crystal display surfaces, etc.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. A fluid flow management apparatus, comprising:
   first and second tanks; and
   a trough coupled between the first and second tanks, the trough comprising:
      a first side panel coupled to the first tank at a top end;
      a second side panel coupled to the second tank at the top end, the second panel coupled to the first panel at a bottom end of the first and second side panels, the first and second side panels having a depth extending greater than 2 inches down from the top ends of the first and second tanks; and
      an air guide disposed between the first and second side panels of the trough.

2. The apparatus of claim 1, wherein the trough further comprises:
   first and second lips coupled to the first and second panels at the bottom end on opposing ends, the first and second side panels and first and second lips to contain a liquid therebetween; and
   one or more drain ports coupled to one or more respective holes formed at the bottom end of the first and second side panels to drain the liquid.

3. The apparatus of claim 1, wherein the trough further comprises a bottom panel and wherein the first and second side panels are coupled together with the bottom panel, and wherein the first and second side panels and the bottom panel of the trough form substantially a U shape.

4. The apparatus of claim 1, wherein the first and second side panels form substantially a V shape.

5. The apparatus of claim 1, wherein a width between the first and second side panels at the top end is greater than 3 inches.

6. The apparatus of claim 4, wherein the V shape forms an angle, between the first and second side panels, in a range of 20 to 60 degrees.

7. The apparatus of claim 1, wherein the first and second side panels of the trough are closer to each other at the bottom end than at the top ends.

8. The apparatus of claim 1, wherein the first and second side panels of the trough are un-perforated.

9. The apparatus of claim 1, wherein the air guide is removably situated between the first and second side panels of the trough.

10. The apparatus of claim 1, wherein the air guide is affixed to the first and second side panels.

11. The apparatus of claim 1, wherein the air guide comprises first and second angled plates disposed perpendicular to the first and second side panels of the trough.

12. The apparatus of claim 11, wherein the air guide comprises first and second curved plates disposed perpendicular to the first and second side panels of the trough.

13. The apparatus of claim 12, wherein a depth of the curved plates is not greater than three quarters of a depth of the first and second tanks.

14. The apparatus of claim 10, wherein the air guide is affixed to the first and second side panels by integrally forming the air guide with the first and second side panels of the trough.

15. The apparatus of claim 10, wherein the air guide is affixed to the first and second side panels by one or more attachment members.

16. The apparatus of claim 12, wherein the curved plates have a fixed curvature.

17. The apparatus of claim 12, wherein the curved plates have a variable curvature.

18. The apparatus of claim 1, wherein the first and second side panels having a depth extending greater than 1 foot down from the top ends of first and second tanks.

19. The apparatus of claim 1, wherein the first and second side panels having a depth extending approximately 18 inches down from the top ends of first and second tanks.

20. The apparatus of claim 1, wherein the width between the first and second side panels at the top end is approximately in a range of 14 to 18 inches.

21. A fluid flow management method, comprising:
directing air towards first and second tanks; and
providing an air path between the first and second tanks to generate laminar airflow between the plurality of tanks while containing liquid drippings from transfer operations between the plurality of tanks, the air path comprising a trough coupled between the first and second tanks, the trough comprising:
a first side panel coupled to the first tank at a top end;
a second side panel coupled to the second tank at the top end, the second panel coupled to the first panel at a bottom end of the first and second side panels, the first and second side panels having a depth extending greater than 2 inches down from the to ends of the first and second tanks, and
an air guide disposed between the first and second side panels of the trough.

22. The method of claim 21, further comprising reducing air turbulence, using the air path, directly above the plurality of tanks relative to a turbulence generated when no air path is provided between the plurality of tanks.

23. A fluid flow management apparatus, comprising:
first and second tanks; and
a trough coupled between the first and second tanks, the trough comprising:
a first side panel coupled to the first tank at a top end;
a second side panel coupled to the second tank at the top end, the second panel coupled to the first panel at a bottom end of the first and second side panels, the first and second side panels having a depth extending greater than 2 inches down from the top ends of the first and second tanks;
first and second lips coupled to the first and second panels at the bottom end on opposing ends, the first and second side panels and first and second lips to contain a liquid therebetween; and
one or more drain ports coupled to one or more respective holes formed at the bottom end of the first and second side panels to drain the liquid.

\* \* \* \* \*